US008479123B2

(12) United States Patent
Cho

(10) Patent No.: US 8,479,123 B2
(45) Date of Patent: Jul. 2, 2013

(54) ACCESSING FEATURES PROVIDED BY A MOBILE TERMINAL

(75) Inventor: Hye Youn Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 951 days.

(21) Appl. No.: 12/340,469

(22) Filed: Dec. 19, 2008

(65) Prior Publication Data

US 2009/0174668 A1    Jul. 9, 2009

(30) Foreign Application Priority Data

Jan. 9, 2008  (KR) .......................... 10-2008-0002497

(51) Int. Cl.
*G06F 3/14* (2006.01)
*G06F 3/048* (2006.01)

(52) U.S. Cl.
USPC .......................................... 715/864; 715/763

(58) Field of Classification Search
USPC .................................................. 715/864, 763
See application file for complete search history.

(56) References Cited

U.S. PATENT DOCUMENTS

| 5,543,818 | A | * | 8/1996 | Scott .............................. 345/168 |
| 5,737,394 | A | | 4/1998 | Anderson et al. |
| 6,223,059 | B1 | | 4/2001 | Haestrup |
| 6,459,390 | B1 | * | 10/2002 | Kim ................................ 341/20 |
| 6,459,440 | B1 | * | 10/2002 | Monnes et al. ............... 715/808 |
| 6,567,072 | B2 | * | 5/2003 | Watanabe ...................... 345/161 |
| 7,155,671 | B1 | * | 12/2006 | Kim et al. ...................... 715/202 |
| 7,245,943 | B2 | * | 7/2007 | Ryu ............................... 455/566 |
| 7,868,787 | B2 | * | 1/2011 | Chung et al. .................... 341/33 |
| 2002/0063687 | A1 | * | 5/2002 | Kim .............................. 345/160 |
| 2003/0169188 | A1 | * | 9/2003 | Chang ............................ 341/22 |
| 2006/0111152 | A1 | * | 5/2006 | Ryu ............................... 455/566 |
| 2006/0148529 | A1 | * | 7/2006 | Yoon et al. ..................... 455/566 |
| 2006/0281498 | A1 | | 12/2006 | Kim |
| 2007/0037605 | A1 | | 2/2007 | Logan |
| 2007/0156929 | A1 | | 7/2007 | Lian et al. |
| 2007/0260452 | A1 | * | 11/2007 | Lee et al. ........................ 704/10 |
| 2008/0150946 | A1 | * | 6/2008 | Kuo ............................... 345/442 |
| 2008/0307352 | A1 | * | 12/2008 | Chaudhri et al. ............. 715/788 |
| 2009/0075694 | A1 | * | 3/2009 | Kim et al. .................. 455/556.1 |
| 2011/0078184 | A1 | * | 3/2011 | Song et al. .................... 707/770 |

FOREIGN PATENT DOCUMENTS

| CN | 1598744 | 3/2005 |
| CN | 1779621 | 5/2006 |
| CN | 1881843 | 12/2006 |

* cited by examiner

*Primary Examiner* — William Bashore
*Assistant Examiner* — Henry Orr
(74) *Attorney, Agent, or Firm* — Lee, Hong, Degerman, Kang & Waimey

(57) ABSTRACT

A terminal providing one or more features to a user is disclosed. The terminal comprises a control unit, a user input unit, display unit. The control unit provides, on a standby image of the terminal, an option to select type of an inputted character, an option to select one or more menus to execute features associated with the inputted character, or both. The user input unit enables the user to input the character and select type of the character or select one or more of the menus. The display unit displays the inputted character according to the selected type of the character and also displays the menus.

18 Claims, 16 Drawing Sheets

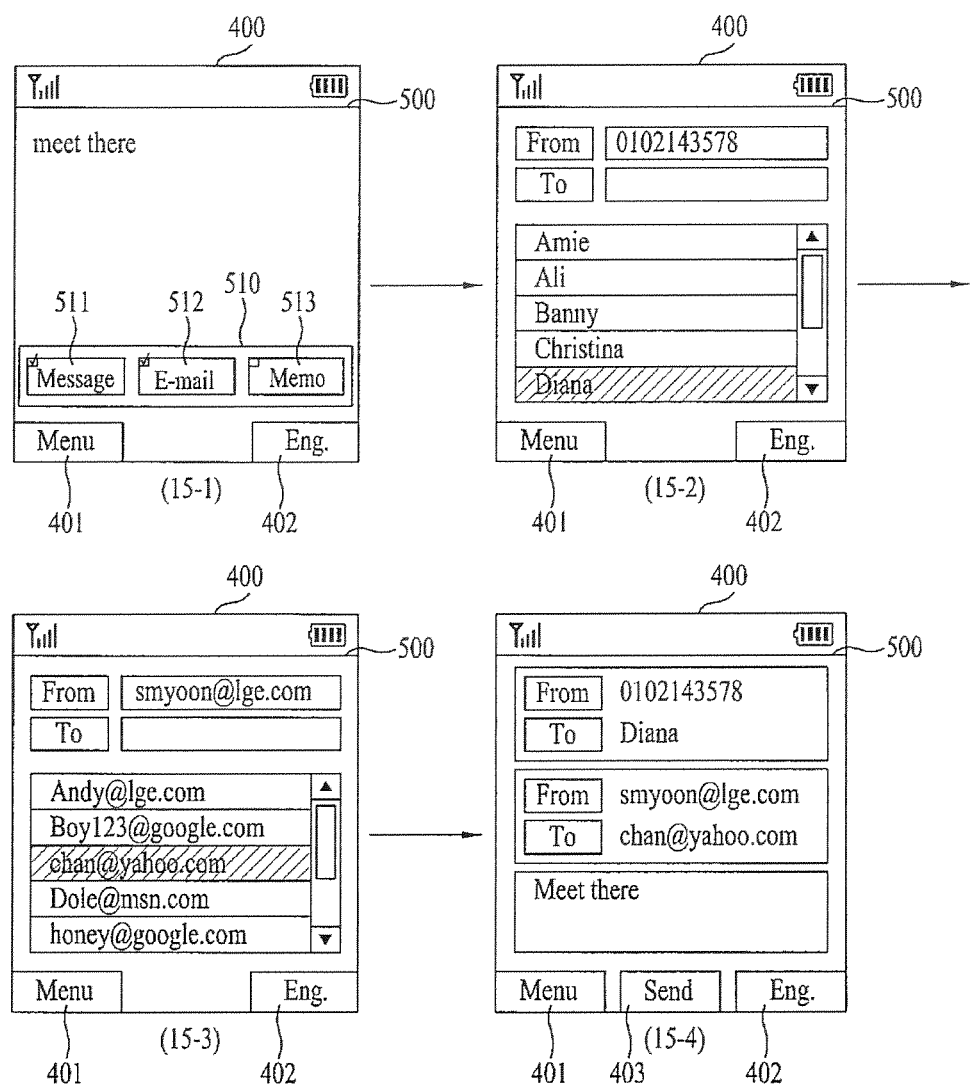

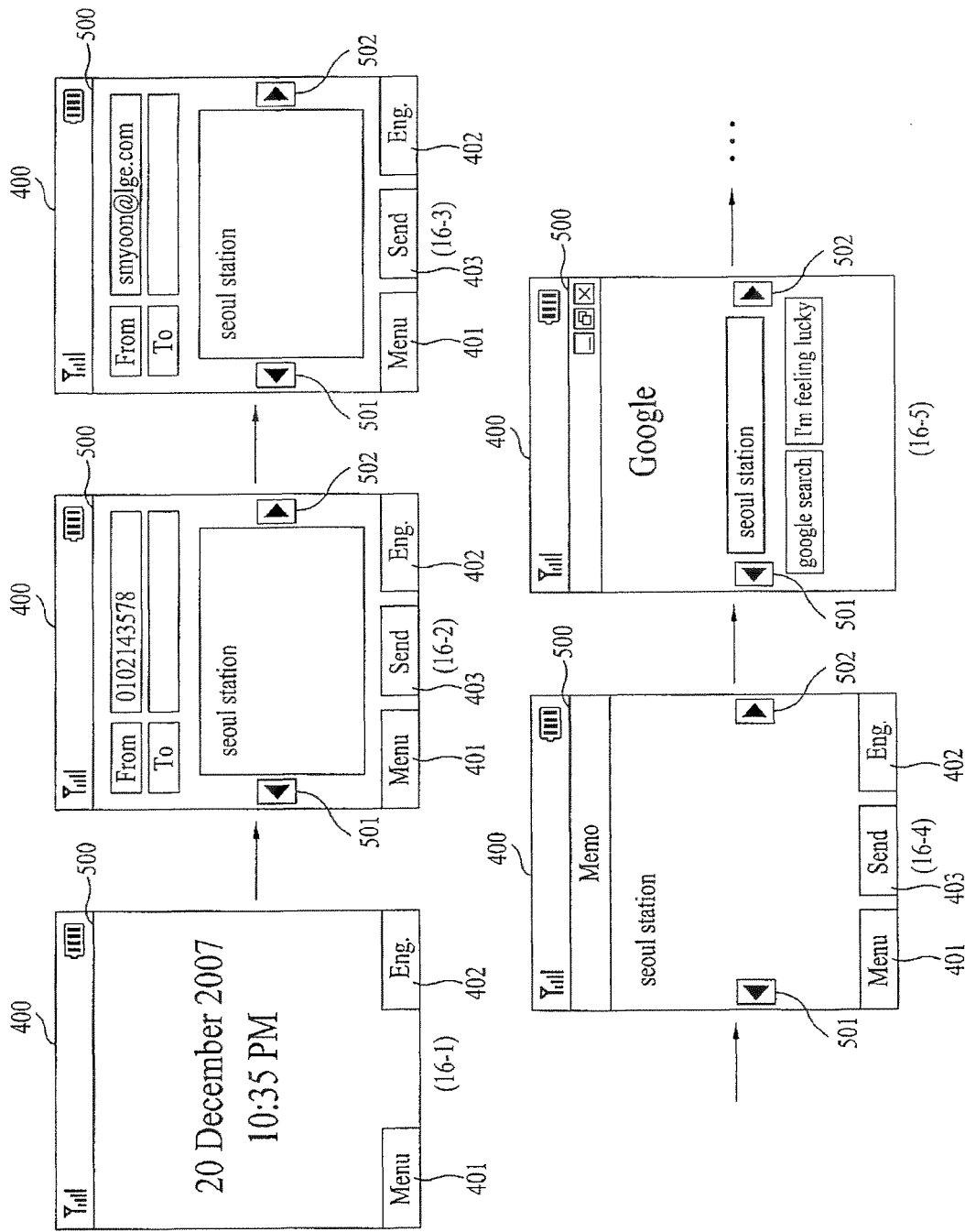

ACCESSING FEATURES PROVIDED BY A MOBILE TERMINAL

CROSS-REFERENCE TO RELATED APPLICATIONS

Pursuant to 35 U.S.C. §119, this application claims the benefit of the Korean Patent Application No. 10-2008-0002497, filed on Jan. 9, 2008, which is hereby incorporated by reference as if fully set forth herein.

TECHNICAL FIELD

The present invention is generally related to a terminal and, more particularly, to convenient access to features provided by the terminal.

BACKGROUND

A terminal may provide various features, or functionality. Examples of such features include data and voice communications, capturing images and video via a camera, recording audio, playing music files and outputting music via a speaker system, and displaying images and video on a display. Some terminals may include additional features to support game playing, while other terminals may be configured as multimedia players. More recently, terminals have been configured to receive broadcast and multicast signals to permit viewing of remote content, such as videos and television programs.

There are ongoing efforts to support the increasing number of features provided by terminals. Such efforts include software and hardware improvements, as well as changes and improvements in the structural components which form the terminal.

SUMMARY

A computer-implemented method for a terminal is provided. The method comprises providing selectable user interface menu options for inputting one or more characters into an edit screen displayable on a display screen of the mobile terminal, wherein the user interface menu options are provided prior to the edit screen being displayed on the display, such that the edit screen is automatically displayed when the user selects one of the menu options associated with selecting a type of character to be inputted in the edit screen, wherein the character type comprises at least one of numeric type, text type of a first language, text type of a second language and special text characters.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

Additional advantages, objects, and features of the invention will be set forth in part in the description which follows and in part will become apparent to those having ordinary skill in the art upon examination of the following or may be learned from practice of the invention. The objectives and other advantages of the claimed subject matter may be realized and attained by the structures particularly pointed out in the written description and claims hereof as well as the appended drawings.

In accordance with one embodiment, a terminal providing different character types is disclosed. The terminal comprises a control unit for providing, on a standby image, an option to select type of a character; a user input unit for enabling the user to select the type of the character and input the character; and a display unit for displaying the inputted character according to the selected type of the character.

In accordance with one embodiment, a terminal providing one or more features to a user is disclosed. The terminal comprises a control unit for providing, on a standby image, an option to select one or more menus to execute features associated with an inputted character; a user input unit for enabling a user to input the character and select the menus; and a display unit for displaying the inputted character and the menus.

In accordance with one embodiment, a computer-implemented method for a terminal is provided. The method comprises displaying a standby image while the terminal is in a standby mode; and providing an option for selecting type of an inputted character on the standby image.

In accordance with one embodiment, a computer-implemented method for a terminal is provided. The method comprises displaying a standby image while the terminal is in a standby mode; and providing an option for selecting one or more menus to execute features associated with an inputted character on the standby image.

In accordance with one embodiment, a system comprising one or more logic units is provided. The one or more logic units are configured to perform the functions and operations associated with the above-disclosed embodiments.

In accordance with one embodiment, a computer program product comprising a computer useable medium having a computer readable program is provided. The computer readable program when executed on a computer causes the computer to perform the functions and operations associated with the above-disclosed embodiments.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the present invention are understood by referring to the figures in the attached drawings, as provided below.

FIG. 15 is a diagram of a display screen of a terminal in which a user may opt to send a message over a text messaging service and an email service as the part of a single message delivery procedure, in accordance with one embodiment.

FIG. 16 is a diagram of a display screen of a terminal in which a user may interact with a sequentially implemented menu feature to apply a certain procedure to an input set of characters, in accordance with one embodiment.

DETAILED DESCRIPTION OF EXEMPLARY EMBODIMENTS

Reference will now be made in detail to exemplary embodiments, which are illustrated in the accompanying drawings. It is to be understood by those of ordinary skill in this technological field that other embodiments may be utilized, and structural, electrical, as well as procedural changes may be made without departing from the scope of the claimed subject matter. Wherever possible, the same reference numbers will be used throughout the drawings to refer to the same or like parts.

As used herein, the suffixes "module," "unit," and "part" for elements in order to facilitate the disclosure. Therefore, significant meanings or roles are not given to the suffixes themselves and it is understood that the "module," "unit," and "part" may be used together or interchangeably.

Figure 1:
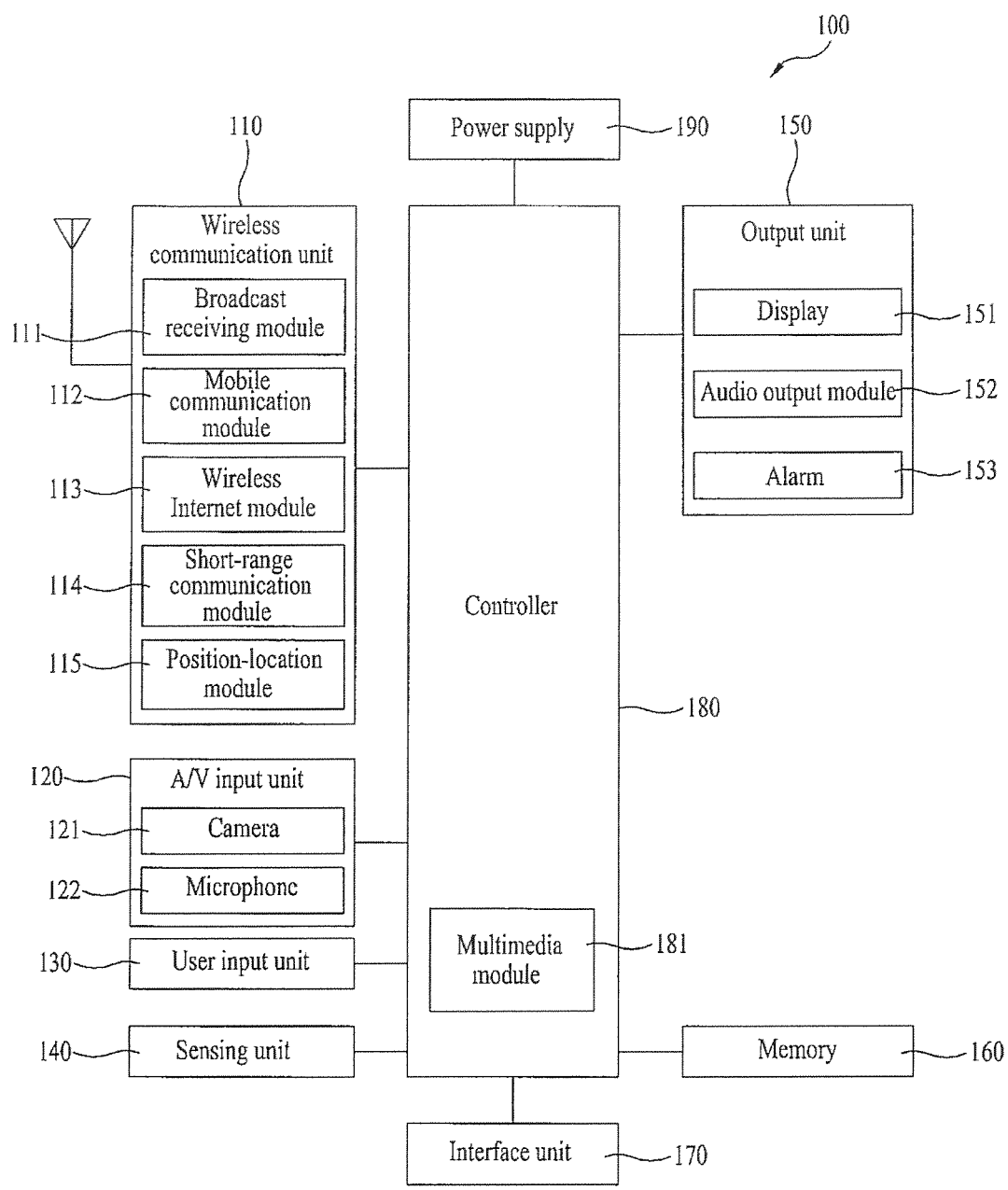
FIG. 1 is a block diagram of a terminal, in accordance with one embodiment.

FIG. 1 is a block diagram of a mobile terminal 100, in accordance with one embodiment. The mobile terminal 100 may be implemented using a variety of different types of terminals. Examples of such terminals include mobile as well as non-mobile terminals, such as mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 may be replaced with a wire communication unit. The wireless communication unit 110 and wire communication unit may be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

Examples of broadcast associated information include information associated with a broadcast channel, a broadcast program, a broadcast service provider, etc. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data. A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module may be replaced with a wire internet module in non-mobile terminals. The wireless internet module 1113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using global positioning system (GPS) components which cooperate with associated satellites, network components, and combinations thereof.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the mobile terminal 100 is in a particular mode, such as phone call mode, recording mode or voice recognition mode. This audio signal is processed and converted into digital data.

The mobile terminal 100, specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. In one embodiment, the user input unit 130 may be configured as a touchpad in cooperation with a touch-screen display, as provided in more detail below.

A sensing unit 140 provides status measurements of various aspects of the mobile terminal 100. For example, the sensing unit 140 may detect an openclose status of the mobile terminal 100, relative positioning of components such as a display and keypad of the mobile terminal 100, a change of position of the mobile terminal 100 or a component of the mobile terminal 100, a presence or absence of user contact with the mobile terminal 100, orientation or acceleration/deceleration of the mobile terminal 100.

If the mobile terminal 100 is configured as a slide-type mobile terminal, the sensing unit 140 may sense whether a sliding portion of the mobile terminal 100 is open or closed. Other examples include the sensing unit 140 sensing the presence or absence of power provided by the power supply 190 or the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, or terminating a phone call. As another example, if the mobile terminal 100 is in a video call mode or a photographing mode, the display 151 may additionally or alternatively display images associated with these modes.

In one embodiment, the display 151 may be configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152 which supports the audio output requirements of the mobile terminal 100. The audio output module 152 is often implemented using one or more speakers, buzzers, other audio producing devices, or combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

In one embodiment, map information may be stored in the memory 160, such that user convenience may be enhanced by providing the map information to a user on request. A recent use history or a cumulative use frequency of each menu in the mobile terminal may also be stored in the memory 160. The recent use history or the cumulative use frequency will be described in more detail below.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 may perform the control and processing associated with voice calls, data communications, instant message communication, video calls, camera operations, or recording operations. The controller 180 may include a multimedia module 181 that provides multimedia playback. The multimedia module 181 may be configured as part of the controller 180 or as a separate component. A power supply 190 provides power required by the various components included in the mobile terminal 100. The power may be internal power, external power, or a combination thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. Logic code may be implemented as a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type, or a combination thereof. By way of example, further disclosure will primarily relate to a slide-type mobile terminal 100, However such teachings apply equally to other types of mobile terminals.

Figure 2:
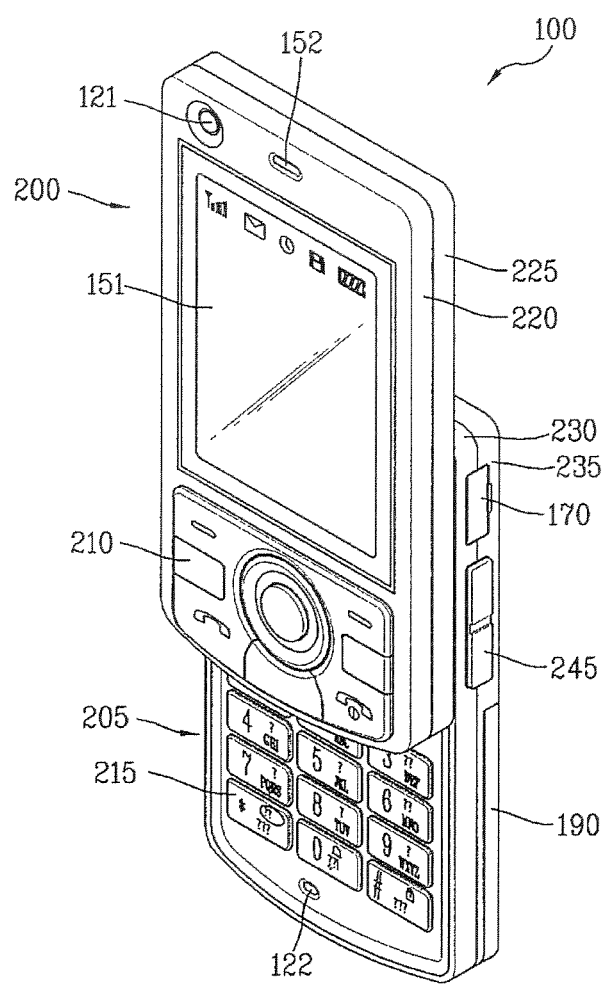
FIG. 2 is a perspective diagram of a front side of a terminal, in accordance with one embodiment.

FIG. 2 is a perspective view of a front side of a mobile terminal 100, in accordance with one embodiment. In FIG. 2, the mobile terminal 100 is shown having a first body 200 configured to slidably cooperate with a second body 205. In one embodiment, the user input unit 130 described in FIG. 1 may include a first input unit such as navigation keys (including, for example, four directional keys and one center key) and function keys 210, a second input unit such as keypad 215, and a third input unit such as side key(s) 245.

The function keys 210 may be associated with the first body 200, and the keypad 215 may be associated with the second body 205. The function keys 210 may be configured so that a user can conveniently enter commands such as start, stop, and scroll. The keypad 215 includes various keys such as numbers, characters, and symbols to enable a user to place a call, prepare a text or multimedia message, and otherwise operate the mobile terminal 100. Depending on implementation, the side keys 245 may be configured as hot keys associated with a particular feature of the mobile terminal 100.

As shown in FIG. 2, the first body 200 slides relative to the second body 205 between open and closed positions. Although not shown in drawings, in case of a folder-type mobile terminal, a first body thereof folds and unfolds relative to a second body thereof between open and closed positions. In case of a swing-type mobile terminal, a first body thereof swings relative to a second body thereof between open and closed positions.

Referring back to FIG. 2, in a closed position, the first body 200 is positioned over the second body 205 in such a manner that the keypad 215 is substantially or completely obscured by the first body 200. In the open position, user access to the keypad 215 is possible. The mobile terminal 100 is operable in either a standby mode, in which it is able to receive a call or message and to receive and respond to network control signaling, or in an active call mode. Typically, the mobile terminal 100 functions in the standby mode in the closed position and in an active mode in the open position. This mode configuration may be changed as required or desired.

The first body 200 comprises a first case 220 and a second case 225. The second body 205 comprises a first case 230 and a second case 235. The first case 230 and second case 235 are usually formed from a suitably rigid material, such as injection molded plastic, or formed using metallic material, such as stainless steel (STS) and titanium (Ti). One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it can be selectively positioned relative to first body 200 such as by rotation or, swiveling. The function keys 210 are positioned adjacent to a lower side of the display 151, which is shown implemented as an LCD or OLED. In one embodiment, the display may be configured as a touch screen having an underlying touchpad which generates signals responsive to user contact with the touchscreen, such as with a finger or stylus.

Figure 3:
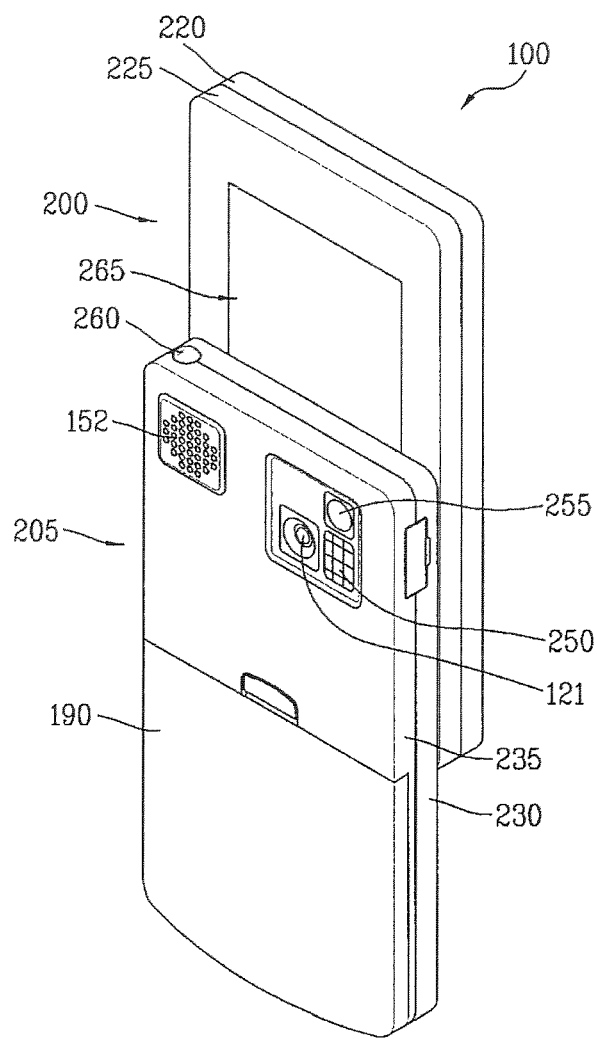
FIG. 3 is a perspective diagram of a backside of the terminal shown in FIG. 2, in accordance with one embodiment.

The second body 205 is shown having a microphone 122 positioned adjacent to the keypad 215 and having side keys 245, which are one type of a user input unit as mentioned above, positioned along the side of second body 205. An interface unit 170 is shown positioned adjacent to the side keys 245, and a power supply 190 in a form of a battery is shown located on a lower portion of the second body 205. FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 (FIG. 2). Depending on implementation, each of the cameras 121 of the first body 200 and second body 205 may have the same or different capabilities. In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone. A broadcast signal receiving antenna 260 is shown located at an upper end of the second body 205. The antenna 260 functions in cooperation with the broadcast receiving module 111 (FIG. 1). The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

The mobile terminal 100 of FIGS. 1-3 may be configured to operate within a communication system which transmits data via frames or packets, including both wireless and wired communication systems, and satellite-based communication systems. Such communication systems may utilize different air interfaces and/or physical layers.

Examples of air interfaces utilized by the communication systems include example, frequency division multiple access (EDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
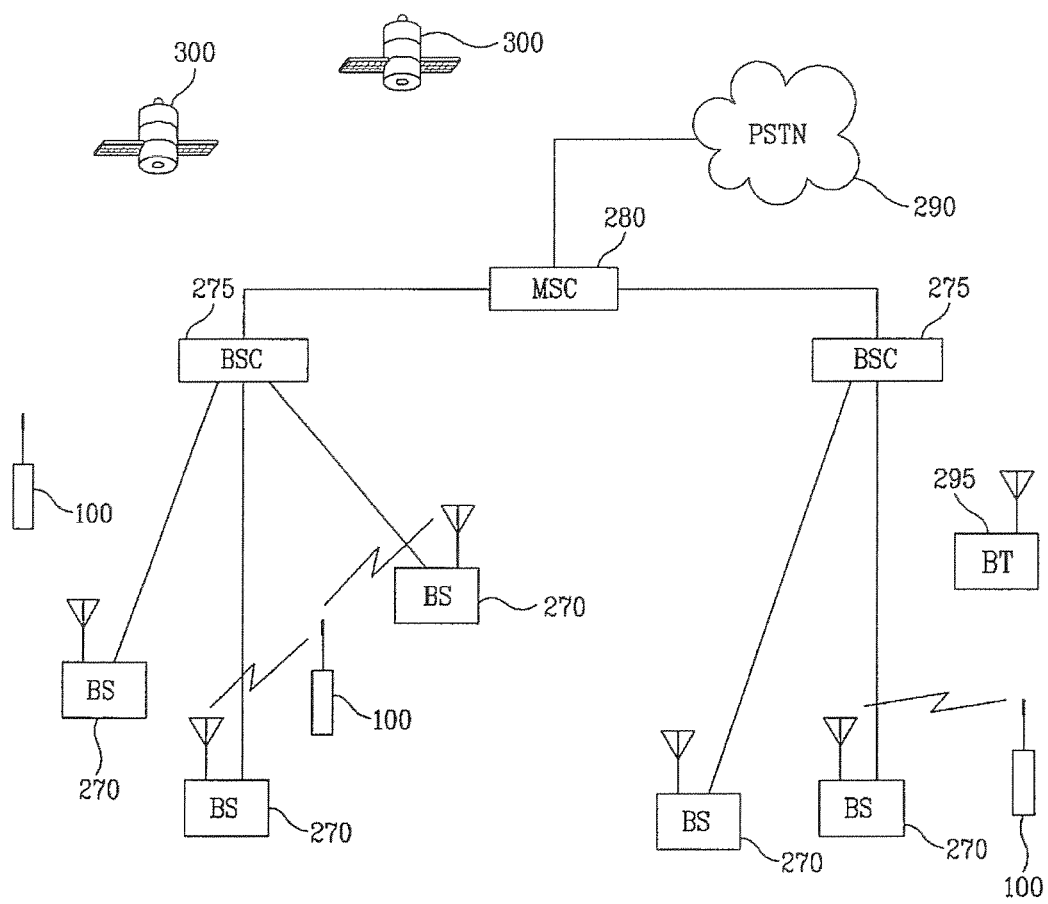
FIG. 4 is a block diagram of a wireless communication system in which a terminal may operate, in accordance with one embodiment.

Referring to FIG. 4, a CDMA wireless communication system is shown having a plurality of mobile terminals 100, a plurality of base stations 270, a plurality of base station controllers (BSCs) 275, and a mobile switching center (MSC) 280. The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or XDSL. It is to be understood that the system may include more than two BSCs 275.

Each base station 270 may include one or more sectors, each sector having an omni-directional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but it is to be understood that useful positioning information may be obtained with greater or fewer satellites.

The position-location module 115 (FIG. 1) of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, or other communications. Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN 290 interfaces with the MSC 280, and the MSC 280 interfaces with the BSCs 275. The BSCs 275 control the base stations 270 to transmit sets of forward-link signals to the mobile terminals 100. In the following description, a control method applicable to the above-configured mobile terminal 100 is provided with respect to various embodiments. It is to be understood that the following embodiments may be implemented independently or through combinations thereof.

The following description proceeds on the assumption that the display module 151 does not include a touchscreen. However, please note that the embodiments described in the following description are equally applicable to a display module 151 including a touchscreen. A method of selecting a feature provided by the mobile terminal 100 is explained below with reference to FIGS. 5-7.

Figure 6:
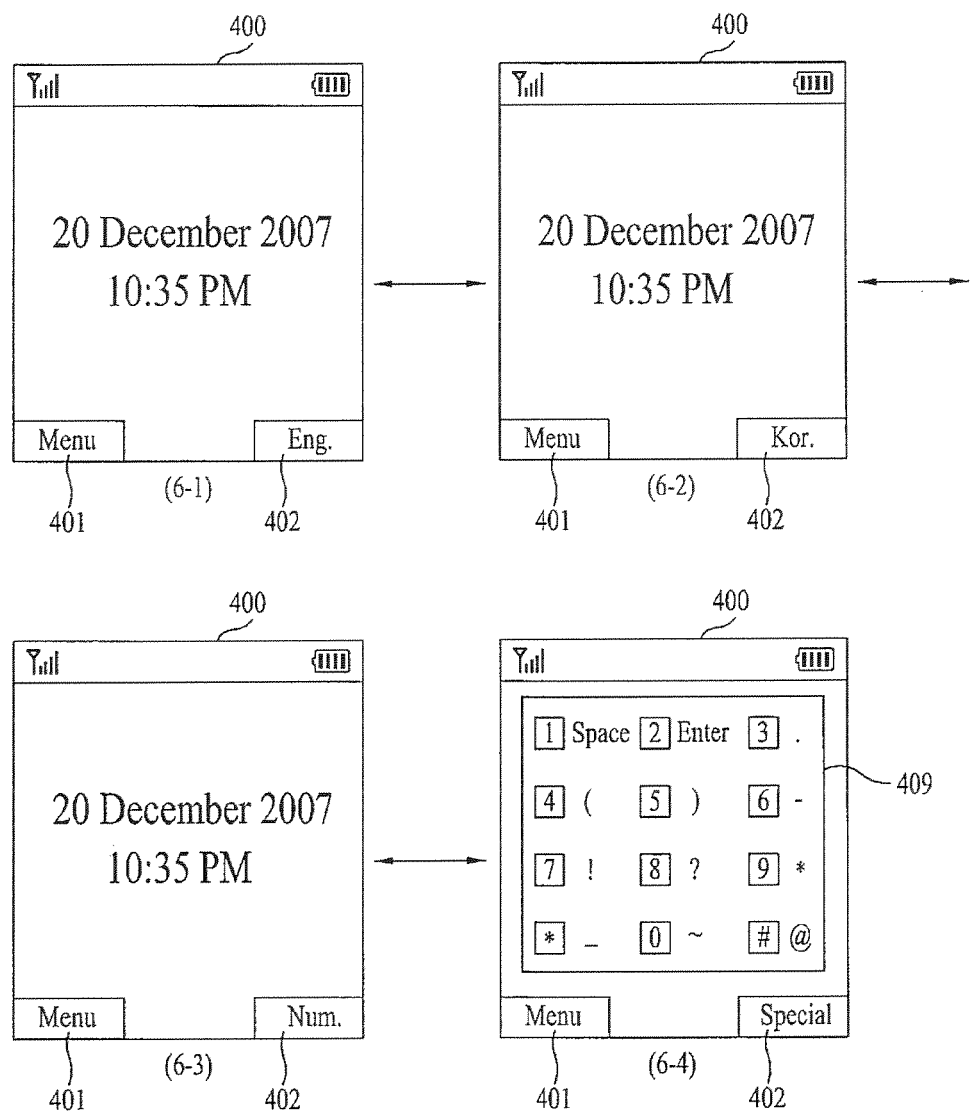
FIG. 6 and FIG. 7 are diagrams of a display screen of a terminal illustrating different menu options for character input, in accordance with one embodiment.

As illustrated in FIG. 6, a graphical user interface (GUI) object such as a soft button may be provided on a default screen of the mobile terminal. The default screen, as shown in this exemplary embodiment, shows the time and date. The soft button may be associated with a menu option that allows a user to select the type for a character to be inputted into an edit screen (not shown). The type for a character may be selected based on a language (e.g., English or Korean), whether the character is a number, or whether the character is a special character (e.g., #, @, etc.). User interaction with the menu options allows the user to enter a character from the type of characters selected, so that when the user interacts with a keypad of the mobile terminal the characters mapped to the particular key selected on the keypad are entered into an edit window. As shown in FIG. 6 (6-4), for example, the special character "?" may be mapped to the key number 8 on the keypad.

Referring to (6-1) of FIG. 6, an image in a standby mode (hereinafter named 'standby image') is displayed on a display screen 400 of the mobile terminal 100. A lower left side icon 401 and a lower right side icon 402 are displayed on a lower side area of the standby image. Although not shown in (6-1) of FIG. 6, a lower middle side icon (cf. '403' in (13-3) of FIG. 13) may be displayed on the lower side area of the standby image.

The lower left side icon 401, the lower right side icon 402, and the lower middle side icon 403 may be selected via first soft key (not shown in the drawing), second soft key (not shown in the drawing), and center key of a navigation key (not shown in the drawing) provided to the user input unit 130, respectively, for example. If the display module 151 includes a touchscreen, the lower left side icon 401, the lower right side icon 402, and the lower middle side icon 403 may be selected via touching the touchscreen.

The lower left side icon 401, as shown in FIG. 6, is associated with a menu selection feature that allows a user to select one of various menus within the mobile terminal 100. The lower right side icon 402, as shown in FIG. 6, is associated with a character type feature that allows a user to select the type of character that will be inputted if a user input unit (e.g., a keypad) is manipulated to input a character to the standby image [S51]. The types of characters may include English, Korean, numerals, special characters, and the like, for example.

In (6-1) of FIG. 6, the lower right side icon 402 indicates that the standby image character type is English. The lower right side icon 402 may be selected via the second soft key to switch the character type from English to Korean, as shown in (6-2) of FIG. 6, for example. The lower right side icon 402 may also be selected via the second soft key to switch the character type from Korean to Numeral, as shown in (6-3) of FIG. 6, for example. The lower right side icon 402 may further be selected via the second soft key to switch the character type from Number to Special Character, as shown in (6-4) of FIG. 6, for example.

If the lower right side icon 402 is selected via the second soft key to switch the character type from Numeral to Special Character, a list window of special characters may be displayed on the display screen 400, as shown in (6-4) of FIG. 6, for example. A user may input a special character to the standby image by manipulating the keypad or other user input unit 130 to select a special character to display on the display screen 400.

Figure 5:
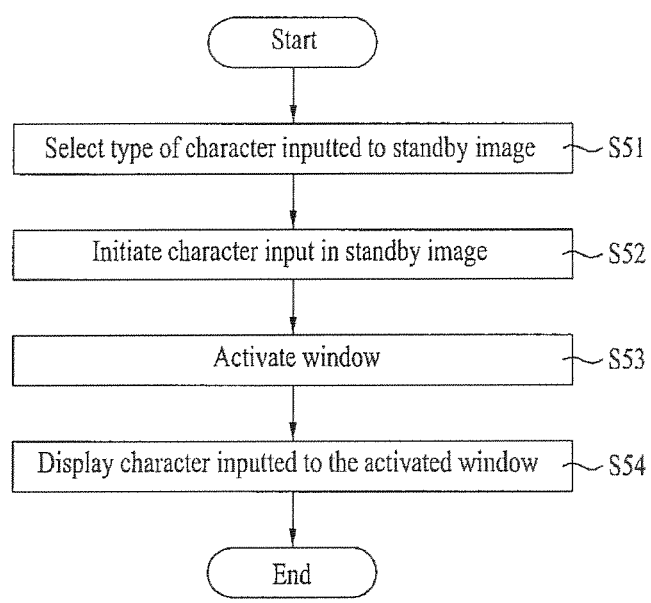
FIG. 5 is a flowchart for a method of inputting a character, in accordance with one embodiment.

Referring to FIG. 5, in accordance with one embodiment, a character type is selected by a user [S51]. In response to the user manipulating the keypad or other user input unit 130 to input a character [S52], a window or image is activated on the display screen 400 [S53], and the character is displayed in the activated window or image [S54]. It is noteworthy that the character type may be switched while character input is in progress. Also, creation and display of a separate window or image is optional as the inputted character may be displayed on the standby image.

Figure 7:
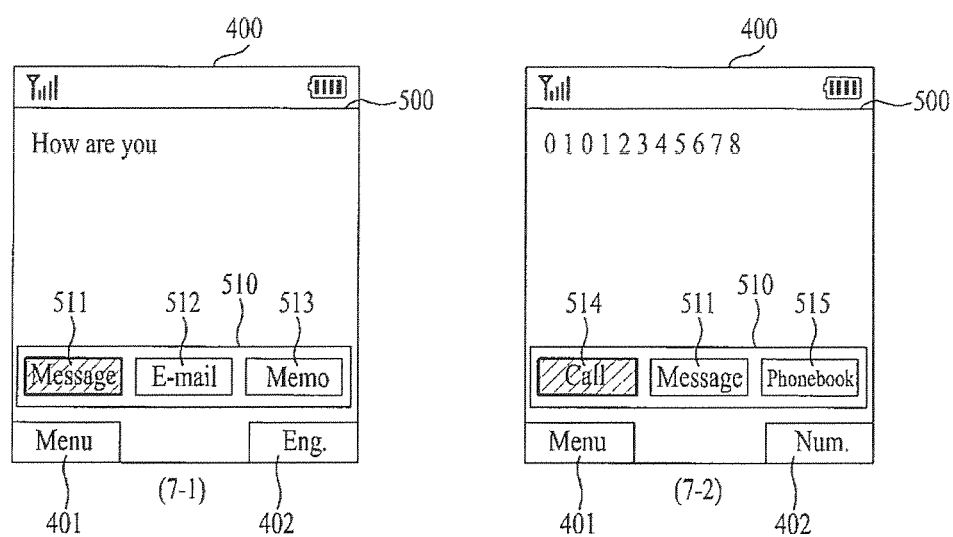

As shown in FIG. 7, in one implementation, the mobile terminal is configured to provide smart menu options to a user based on the type of characters inputted to the mobile terminal within a certain context. For example, entering alphabetic characters provides for a first user interface menu in which three options associated with a text content are provided. Such options provide the user with the ability to either input the content into a memo or send the content by way of text messaging or email, for example. If the inputted characters are of numeric type, then the provided menu to the user may provide options associated with a numeric content such as recognizing the numeric value as a phone number to call, or a phone number to enter into a phone book in the mobile terminal, or including the numeric value into a message to be sent to a destination.

If the inputted character is displayed on the standby image, display 400 may also display a menu list 510 on the lower side of the display 400, as shown in (7-1) and (7-2) of FIG. 7. The menu list 510 may comprise execution candidate menus for selecting and executing features provided by the mobile terminal 100. The execution candidate menus displayed may depend on the type of the inputted character.

Referring to FIG. 5 and (7-1) of FIG. 7, for example, the character type is selected to be English [S51]. In response to a user manipulating the keypad or other user input unit 130 to input a character [S52], an editor window 500 is activated on the display screen 400 [S53], and the character is displayed in the editor window 500 [S54]. A menu 510 comprising a message menu 511, an e-mail menu 512 and a memo menu 513 for executing text messaging, e-mail, and memos, respectively, is displayed on the lower side of display screen 400.

Referring to FIG. 5 and (7-2) of FIG. 7, for example, the character type is selected to be Numeral [S51]. In response to a user manipulating the keypad or other user input unit 130 to input a character [S52], an editor window 500 is activated on the display screen 400 [S53], and the character is displayed in the editor window 500 [S54]. A menu 510 comprising a phone menu 514, a message menu 511, and a phonebook menu 515 for executing a phone call, text messaging, and storing contact information, respectively, is displayed on the lower side of display screen 400.

Figure 8:
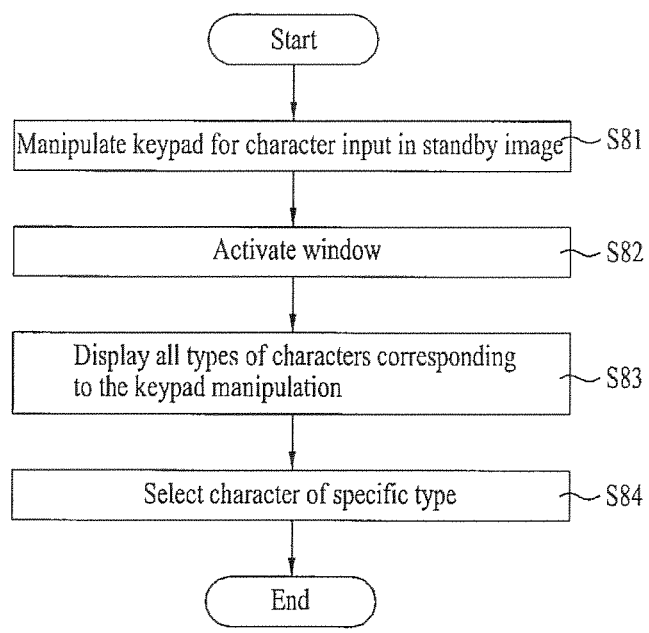
FIG. 8 is a flowchart for a method of automatically recognizing the proper menu items to be displayed for a set of inputted characters, in accordance with one embodiment.

As illustrated in FIG. 8, when a user interacts with a keypad of the mobile terminal, different characters may be mapped to a single key. For example, a single key may be mapped to numeric value 6, alphabetic characters M, N, O, and a set of Korean alphabet. Depending on the sequence of keys that are pressed on the keypad, the mobile terminal is configured to determine and display a set of characters that match the pressed characters. As shown, different possibilities for a sequence of keys pressed by a user may be displayed in different fields on a display of the mobile terminal. Depending on which field is selected by the user, ultimately a corresponding menu option is provided to the user, as provided earlier.

Referring to FIG. 8, in accordance with one embodiment, a user manipulates the keypad of the user input unit 130 to input a character [S81]. In response to the keypad manipulation, as shown in (9-1) of FIG. 9, an editor window (or image) 500 for displaying the character input is activated on the display screen 400 [S82], and at least two types of characters corresponding to the keypad manipulation are displayed in the editor window 500 [S83], for example. In (9-2) of FIG. 9, three kinds of character type writings (e.g., numerals, English writing, Korean writing) corresponding to the keypad manipulation are displayed in the editor window 500, for example.

Subsequently, a specific character type is selected from the displayed the character types via the navigation key [S84]. The selection is made in a manner of placing a cursor on the specific type of character using the navigation key. This is apparent to those skilled in the art and will be omitted in the following description for clarity of this disclosure.

Figure 9:
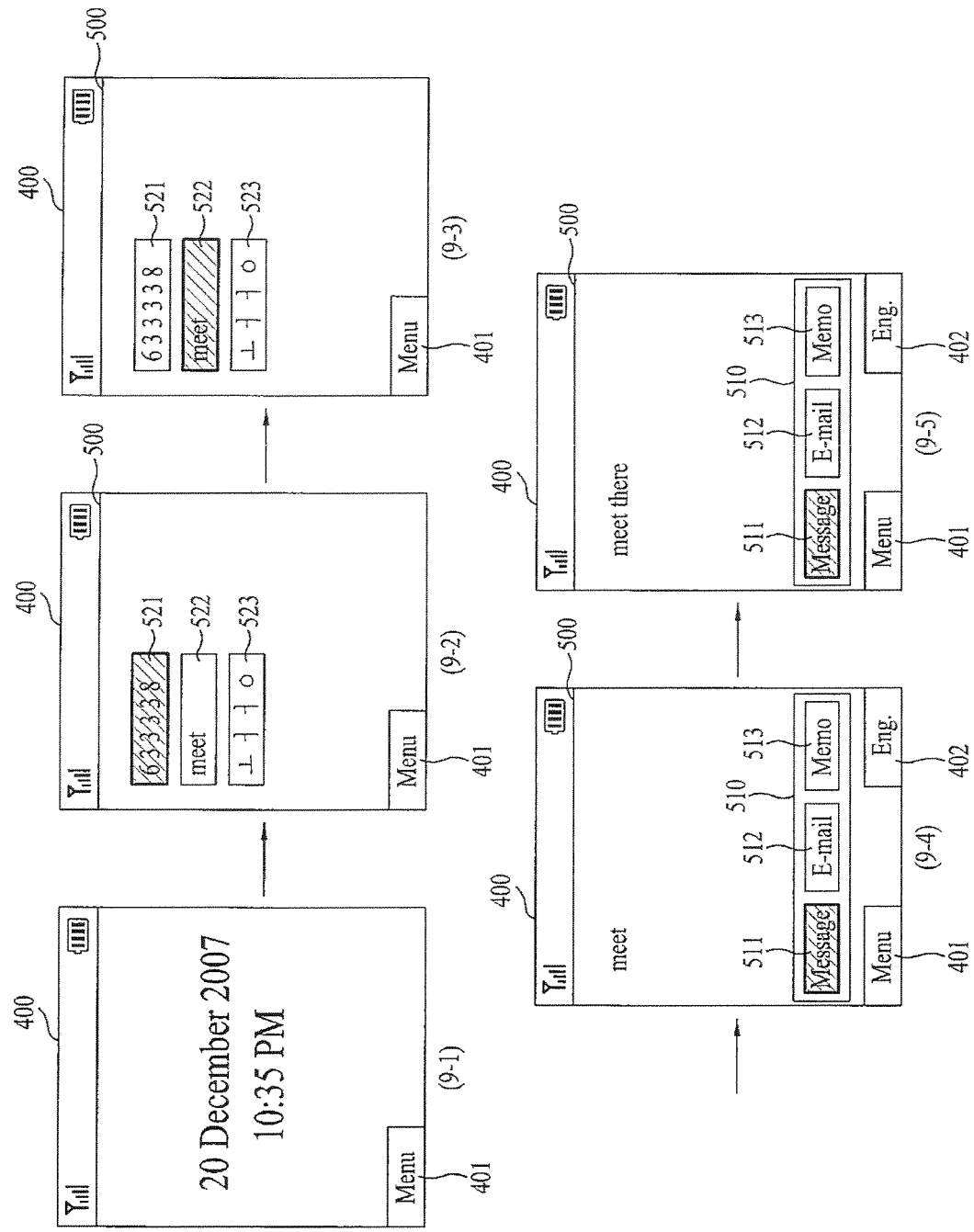
FIG. 9 is a diagram of a display screen of a terminal illustrating how the proper menu items are displayed for a set of inputted character, in accordance with one embodiment.

For example, if English is selected, as shown in (9-4) of FIG. 9, characters corresponding to the keypad manipulation according to English are displayed. Optionally, the user is able to keep inputting more English characters in continuation with the displayed characters, as shown in (9-5) of FIG. 9.

Execution candidate menus may be displayed according to a preset configuration (i.e. configuration set during manufacture of the mobile terminal 100) or according to a user configuration. In some embodiments, execution candidate menus may further be displayed in order of the cumulative use frequency or recent use.

Figure 11:
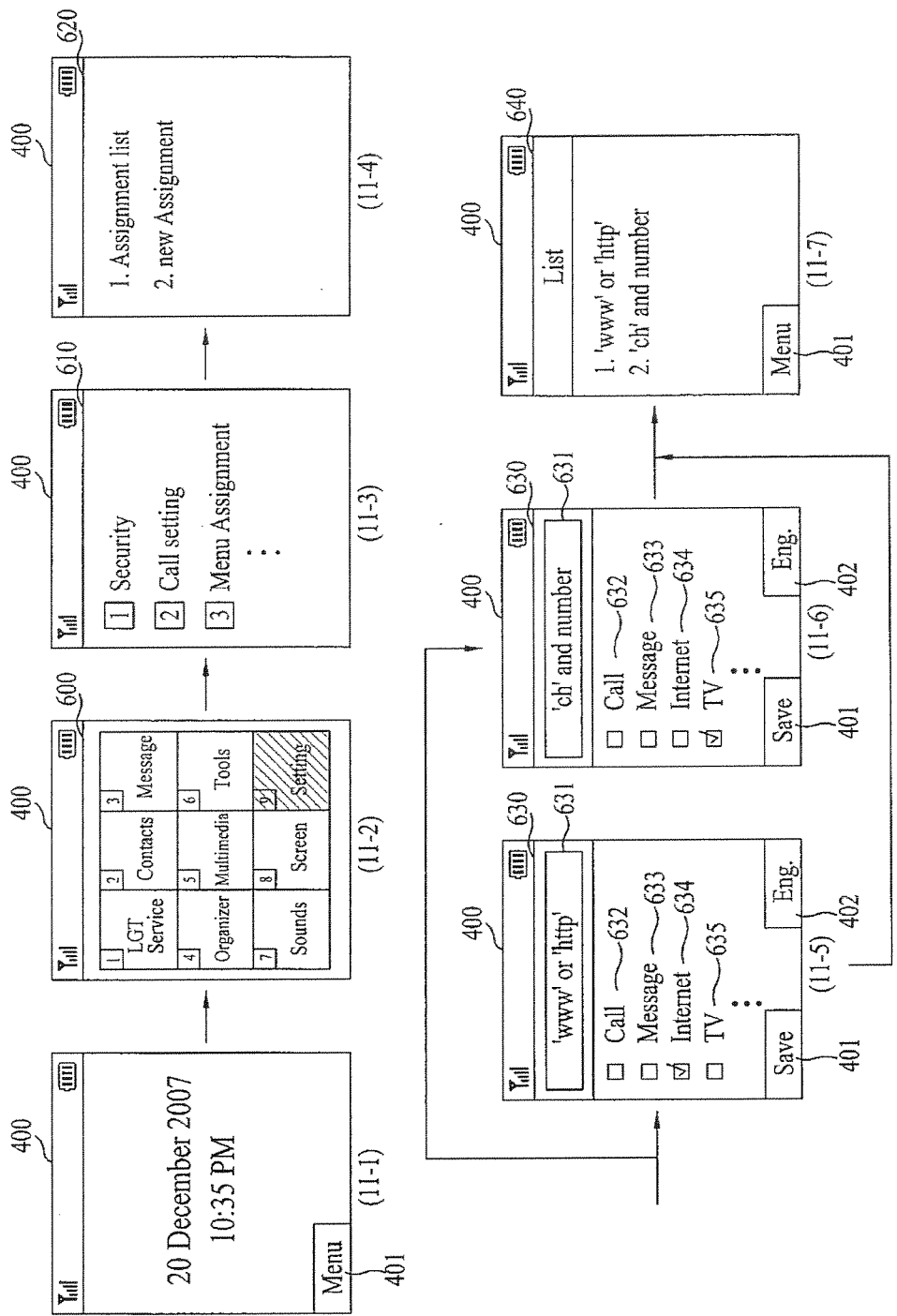
FIG. 11 and FIG. 12 are diagrams of a display screen of a terminal in which a custom setting for the proper recognition of the inputted characters is provided, in accordance with one embodiment.

In (11-1) of FIG. 11, a standby image is displayed on the display screen 400 of the mobile terminal 100. If a user selects the menu selection feature associated with the lower left side icon 401, menus 600, including "9. Setting" are displayed on the display screen 400, as shown in (11-2) of FIG. 11.

The user may select a menu in various ways. For example, the user may press a number on the keypad (e.g., 9) to select a particular menu (e.g., "9. Setting"). When a user selects a menu, submenus 610 of the menu may be displayed on the display screen 400, as shown in (11-3) of FIG. 11, with respect to the "9. Setting" menu. In (11-4) of FIG. 11, the "3. Menu Assignment" submenu 610 is selected from the submenus 610 by, for example, the user pressing the corresponding number key 3 on the keypad.

Selecting a submenu 610 may cause submenus 620 to be displayed on the display screen 400. In (11-4) of FIG. 11, for example, submenus 620 of the "3. Menu Assignment" submenu 610 are displayed on the display screen 400 of the mobile terminal 100. In the displayed submenus 620, "2. New Assignment" may provide a feature to associate an execution candidate menu with an inputted character type. "1. Assignment List" may provide a feature to enable a user to view an execution candidate menu assignment list for an inputted character, for example.

An execution candidate menu may be assigned to an inputted character or a combination of inputted characters by selecting a new assignment menu (e.g., "2. New Assignment) that provides the feature for associating an execution candidate menu with inputted characters. In response to selecting the new assignment menu, a menu assignment window (or image) 630 is displayed on the display screen 400, as shown in (11-5) and (11-6) of FIG. 11, for example.

The menu assignment window 630 may display a text box 631 for specifying inputted characters and all execution candidate menus 632, 633, 634 and 635, which may be assigned to the inputted characters identified by the text box 631. The execution candidate menus may include a phone menu, a message menu, an e-mail menu, an internet menu, a memo menu, an electronic dictionary menu, a multimedia menu, a broadcast reception menu, or other menu for executing a feature provided by the mobile terminal 100.

In (11-5) of FIG. 11, "'www' or 'http'" is inputted into the text box 631 and execution candidate menu 634 (i.e., "Internet") is selected. If this configuration is saved using the lower left side icon 401, if "www" or "http" are inputted on the standby image (e.g., "www.lge.com"), the execution candidate menu 134 (i.e., Internet) appears on the menu list 510, for example.

In (11-6) of FIG. 11, "'ch' and number'" is inputted into the text box 631 and execution candidate menu 635 (i.e., "TV") is selected. If this configuration is saved using the lower left side icon 401, if numerals are inputted next the character "ch" on the standby image (e.g., if the inputted characters are 'ch11'), the execution candidate menu 635 (i.e., "TV") appears on the menu list 510, for example, when the inputted characters are displayed. Once an execution candidate menu is assigned to inputted characters, the assignment may be viewed by selecting the assignment list menu (e.g., "1. Assignment List" from (11-5) and (11-6) of FIG. 11).

As provided earlier, execution candidate menus may also be displayed according to a preset configuration. A phone menu, a message menu, a memo menu, or a broadcast reception menu may be assigned to inputted numeral characters, for example. An Internet menu or a memo menu may be assigned to inputted characters that include an expression (e.g., www, http, co, com, gov) relevant to an Internet address, for example. An e-mail menu or a memo menu may be assigned to inputted characters that include an expression (e.g., @) relevant to an e-mail address, for example.

Figure 10:
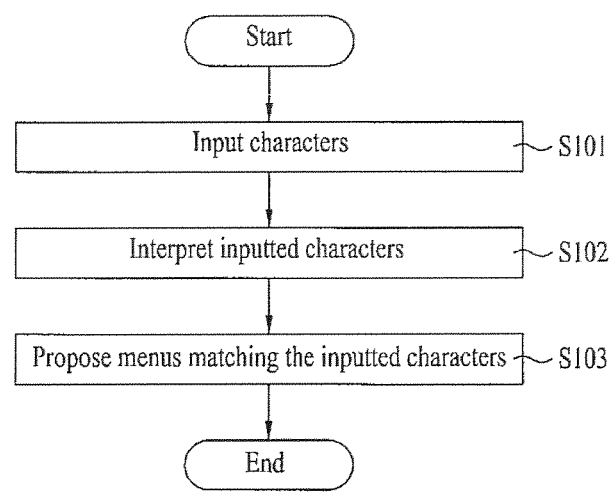
FIG. 10 is a flowchart for a method of selecting a menu option for applying a procedure to an inputted set of characters, in accordance with one embodiment.
Figure 12:
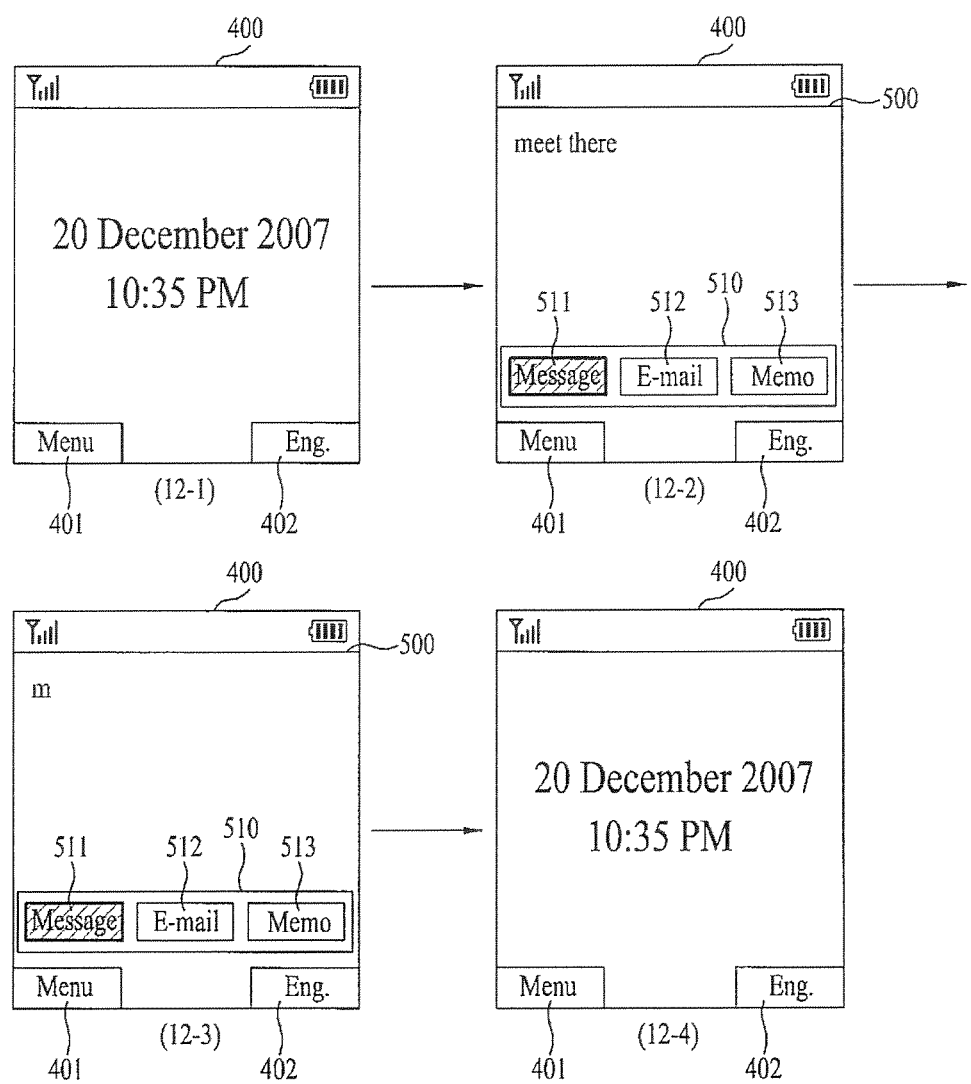

Referring to FIG. 10 and FIG. 12, in accordance with one embodiment, a standby image is displayed on the display screen 400 of the mobile terminal 100, as shown in (12-1) of FIG. 12. In response to characters (e.g., "meet there") being inputted by a user [S101], editor window 500 is activated on display screen 400, as shown in (12-2) of FIG. 12.

The controller 180 processes, or interprets the inputted characters [S102] and searches for execution candidate menus 510 that are assigned to one or more of the inputted characters [S103]. The assigned execution candidate menus 510 (e.g., message menu 511, e-mail menu 512, memo menu 513) are displayed on a lower side area of the display screen 400, as shown in (12-2) of FIG. 12. If one of the execution candidate menus 510 is selected, the inputted characters are applied to the selected menu and are then executed.

In one embodiment, the inputted characters displayed on the editor window 500 are erased gradually, as shown in (12-3) of FIG. 12. Once the characters are entirely erased, the editor window 500 disappears and the display screen 400 enters the standby image mode again, as shown in (12-4) of FIG. 12.

Figure 13:
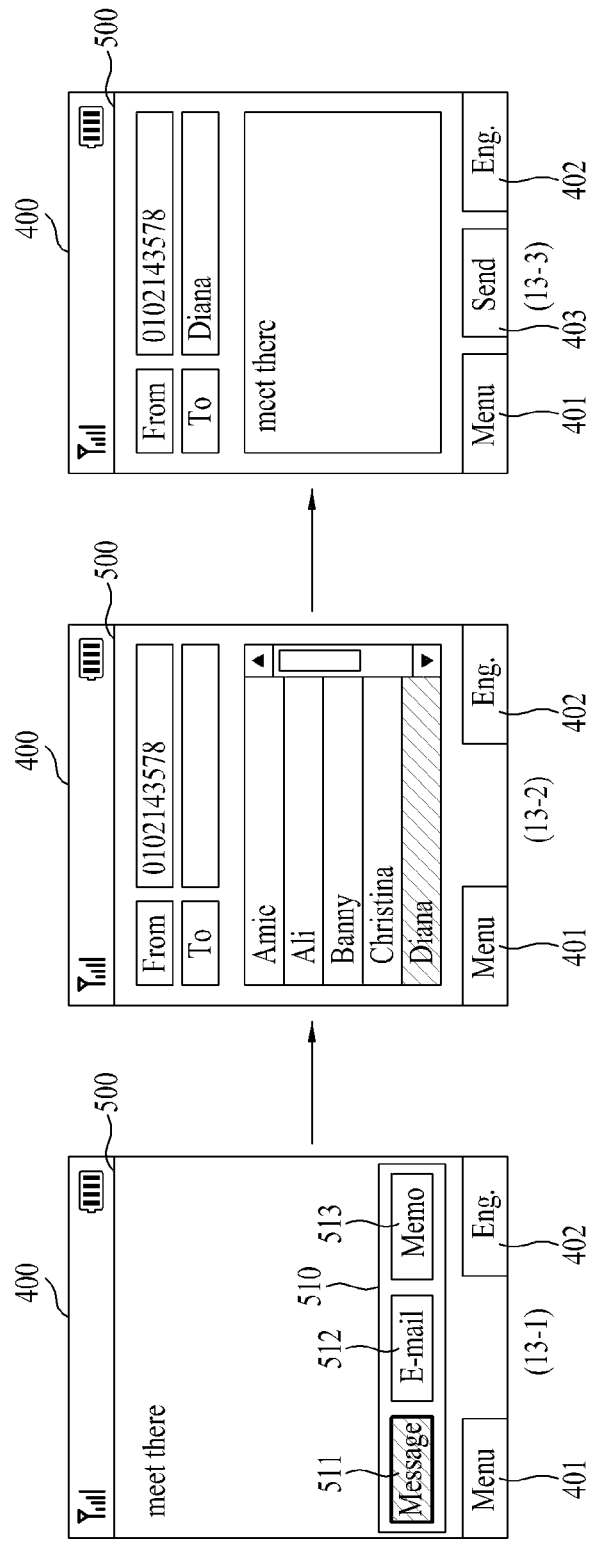
FIG. 13 is a diagram of a display screen of a terminal in which a user may interact with different menu options to send a message over a text messaging service or an email service, in accordance with one embodiment.
Figure 14:
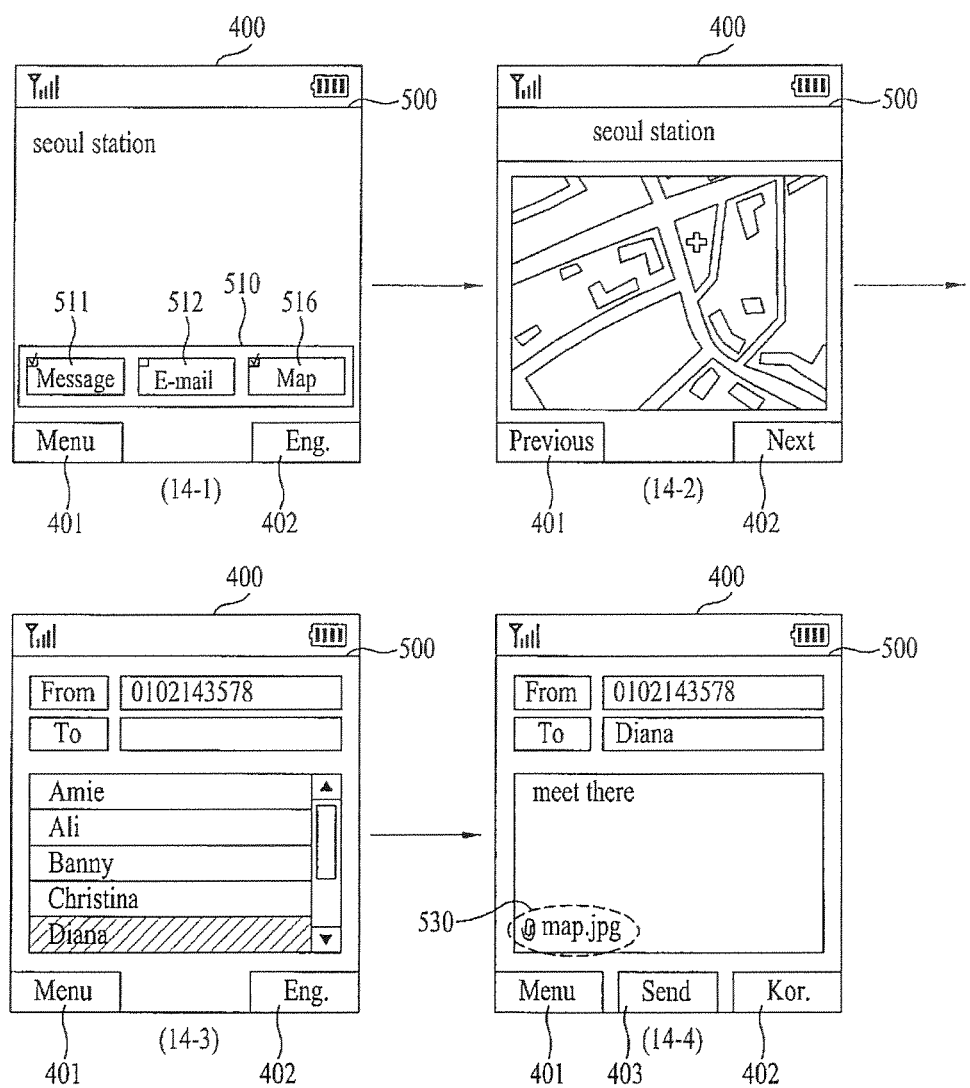
FIG. 14 is a diagram of a display screen of a terminal in which a user can interact with different menu options to send information about the location of a destination to a recipient, in accordance with one embodiment.

FIG. 13-15 illustrates exemplary embodiments of the mobile terminal in which menu options provided to a user allow the user to transmit content including text, images or a map associated with a certain input to a destination by way of text messaging, email or other application by simply selecting the destinations associated with different end users. It is noteworthy that in one embodiment, a single message can be forwarded to multiple destination by way of email or text messaging without having to create separate messages that are sent out separately over different delivery mechanisms. That is, for example, the user would not have to create a first message to transmit by way of text messaging and a copy of the first message to be transmitted by way of email. Instead, as shown, the same first message may be transmitted over both text messaging and email mechanisms by interacting with a single menu option. FIG. 16 illustrates an embodiment wherein an inputted set of characters can be designated for entry into different processes by way of interacting with an option menu that allows a user switch from one process to another. For example, text entered into an edit window may be designated for delivery to a destination by way of text messaging as a default setting. Interacting with a user interface object (e.g., an arrow) may allow a user to go through a sequence of other delivery methods (e.g., via email) or programs (e.g., entry into a memo, entry into a search bar in a search engine).

Referring to (13-1) of FIG. 13, the editor window 500 is displayed on the display screen 400 and inputted characters are displayed in the editor window 500. A menu list 510 of execution candidate menus, to which the inputted characters may be applied and executed, is displayed on a lower side area of the display screen 400.

As shown in (13-2) of FIG. 13, if the message menu 511 is selected, the editor window 500 displays an image for transmitting a message such as a short message service message, a multimedia message, or other message, for example. Once a correspondent party is selected from a list of correspondent parties, a lower middle side icon 403, which is associated with a message transmission, or send, feature, appears, as shown in (13-3) of FIG. 13. A user may select the lower middle side icon 403 to transmit the inputted characters to the selected correspondent party.

Referring to (14-1) of FIG. 14, the editor window 500 is displayed on the display screen 400 and inputted characters are displayed on the editor window 500. A menu list 510 of execution candidate menus, to which the inputted characters may be applied and executed, is displayed on a lower side area of the display screen 400. The menu list 510 is configured to enable at least two execution candidate menus (e.g., message menu 511 and map menu 516) to be simultaneously selected. In one embodiment, once the execution candidate menus are selected, a user may interact with a center key of the navigation key to indicate that menu selection is completed.

As shown in (14-2) of FIG. 14, since map menu 516 is selected, the editor window 500 displays a map corresponding to the inputted characters. In one embodiment, the map may be accessed from the memory 160. Alternatively, the map may be accessed from a server via the Internet. Upon completing viewing of the map, the user may select the next icon, or lower right side icon 402. In response to selecting the next icon 402, the editor window 500 displays an image for transmitting a message, as shown in (14-3) of FIG. 14.

Once a correspondent party is selected from a list of correspondent parties, a lower middle side icon 403, which is associated with a message transmission, or send, feature, appears, as shown in (14-3) of FIG. 14. A user may select the lower middle side icon 403 (i.e., "send") to transmit the inputted characters to the selected correspondent party, as shown in (14-4) of FIG. 14. Once the send icon 403 is selected, the message, to which the accessed map is attached, may be transmitted to the selected correspondent party.

Referring to (15-1) of FIG. 15, both of the message menu 511 and the e-mail menu 512 are selected from execution candidate menus displayed in the menu list 510 on a lower side area of the display screen 400. In one embodiment, a user may press a center key of the navigation key for a predetermined period of time to indicate that the user is done with selecting the menus.

Referring to (15-2) of FIG. 15, the editor window 500 displays an image for a message transmission comprising a list of message correspondent parties. Once a correspondent party is selected from the list (e.g., using the navigation key), the editor window 500 displays an image for an e-mail transmission, which comprises a list of e-mail correspondent parties, as shown in (15-3) of FIG. 15. A user may select an e-mail correspondent party from the list, as shown in (15-4) of FIG. 15. The correspondent party for the e-mail may be identical or different from the correspondent party for the message.

Upon selecting the e-mail correspondent party, the user may select a send icon 403 displayed as a lower middle side icon 403 on the display screen 400, as shown in (15-4) of FIG. 15. In response to selection of the send icon 403, the inputted characters may be transmitted to the selected correspondent parties via the message and the e-mail.

Referring to (16-1) of FIG. 16, characters (e.g., "seoul station") may be inputted into the mobile terminal 100 while the display screen 400 is in a standby image mode. Type of the inputted characters may be determined by selecting the lower right side icon 402, as provided earlier. Once the characters are inputted, an editor image 500 is displayed on the display screen 400, as shown in (16-2) of FIG. 16. The editor image 500 may comprise an image for a first execution candidate menu associated with the inputted characters. In (16-2) of FIG. 16, for example, a message menu image for sending the inputted characters as a message is displayed in the editor image 500.

In one embodiment, if there is a plurality of execution candidate menus assigned to the inputted characters, a user may switch to an image for another menu by selecting a side key of the user input unit 130. In another embodiment, if the mobile terminal 100 comprises a touchscreen, the user may switch to an image for another menu by touching menu switching icons 501 and 502 provided by the touchscreen, as shown in (16-2) through (16-4) of FIG. 16.

In (16-2) of FIG. 16, the editor image 500 displays the image for the message menu. If transmitting a message to a correspondent party is not the feature desired by the user, the user selects the menu switching icon 502, and an image for a second menu (e.g., e-mail menu) is displayed in the editor image 500, as shown in (16-3) of FIG. 16. The user may keep selecting the menu switching icon 502 until the menu for the desired feature shows up.

If so, referring to (16-4) and (16-5) of FIG. 16, third and fourth menus for the inputted characters are sequentially displayed on the editor image 500. In (16-4) and (16-5) of FIG. 16, an image (i.e., memo menu image) for enabling the inputted characters to be memorized and an image (i.e., internet search menu image) for enabling the inputted characters to be used as a keyword of an internet webpage are exemplarily shown as images for the third and fourth menus, respectively.

It is noteworthy that the user may select a side key instead of the menu switching icon 502 to switch the menus. Also, depending on implementation, the sequence of menus displayed by the switching may be determined randomly, in order of cumulative user frequency, or according to recent use.

Accordingly, the present invention provides the following effects and advantages. First of all, in accordance with one embodiment, a user may select the type of characters inputted to a standby image (e.g., different languages). Secondly, in accordance with one embodiment, a user may easily access execution candidate menus to execute features provided by the mobile terminal 100 with minimal manipulation, or user interaction, with the mobile terminal 100. Thirdly, in accordance with one embodiment, execution candidate menus may be assigned to an inputted character according to user preference.

In different embodiments, the invention may be implemented either entirely in the form of hardware or entirely in the form of software, or a combination of both hardware and software elements. For example, mobile terminal 100 may comprise a controlled computing system environment that can be presented largely in terms of hardware components and software code executed to perform processes that achieve the results contemplated by the system of the present invention.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

For instance, the above-described methods may be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via the Internet). The computer may include the controller 180 of the terminal 100.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

The present invention has been described above with reference to one or more features or embodiments. Those skilled in the art will recognize, however, that changes and modifications may be made to these embodiments without departing from the scope of the present invention. These and various other adaptations and combinations of the embodiments disclosed are within the scope of the invention and are further defined by the claims and their full scope of equivalents.

The invention claimed is:

1. A terminal comprising:
a controller for causing a display unit of the terminal to display a menu option while displaying a default screen such that a user can select a type of a character to be input into an edit window without the user first accessing the edit window;
a user input unit for enabling the user to select the type of the character and input the character by interacting with the displayed menu option; and
the display unit for displaying the input character according to the selected type of the character,
wherein the controller is further for causing the display unit to display the input character in the edit window, and
wherein the controller is further for causing the edit window to disappear in response to the input character being erased.

2. The terminal of claim 1, wherein the controller is further for causing the display unit to display one or more character types in response to the user interacting with the user input unit to select the type of the character.

3. The terminal of claim 2, wherein the displayed menu option provides an option to select the type of the character from different languages.

4. The terminal of claim 1, wherein the controller is further for causing the display unit to display additional menu options that are associated with the type of the input character.

5. The terminal of claim 4, wherein the additional menu options are provided at least in part according to editing a context in which the character is input.

6. The terminal of claim 4, wherein the user input unit comprises a key button for selecting one of the displayed additional menu options.

7. The terminal of claim 6, wherein the key button comprises a side key located on a lateral side of the terminal.

8. The terminal of claim 4, wherein the controller is further for causing the display unit to display a first menu simultaneously with the input character.

9. The terminal of claim 6, wherein the controller is further for causing the display unit to display another one of the additional menu options when the key button is activated.

10. The terminal of claim 9, wherein the displayed additional menu options are switched sequentially according to a predetermined order.

11. The terminal of claim 9, wherein the controller is further for causing the display unit to switch an image corresponding to the displayed menu option in response to displaying the another one of the additional menu options.

12. A terminal comprising:
a controller for causing a display unit of the terminal to display a menu option while displaying a default screen such that a user can select a type of a character to be input into an edit window without the user first accessing the edit window;
a user input unit for enabling the user to input the character and select from one or more menu options provided for the input character; and
the display unit for displaying the input character and the one or more menu options,
wherein the controller is further for causing the display unit to display the input character in the edit window, and
wherein the controller is further for causing the edit window to disappear in response to the input character being erased.

13. The terminal of claim 12, wherein the controller is further for causing the display unit to display graphic user interface (GUI) objects corresponding to the displayed one or more menu options and the input character in response to the user interacting with the user input unit to input the character.

14. The terminal of claim 13, wherein the GUI objects are displayed according to a priority.

15. The terminal of claim 12, wherein the user input unit comprises a touchscreen for selecting one of the displayed one or more menu options.

16. The terminal of claim 12, wherein the displayed one or more menu options are assigned to the input character by the user.

17. A computer-implemented method for a terminal, the method comprising:
displaying a standby image while the terminal is in a standby mode; and
providing an option for selecting a character type on the standby image,
wherein, when a character is input in accordance with the selected character type, the input character is displayed in a window, and
wherein the window disappears in response to the input character being erased.

18. A computer-implemented method for a terminal, the method comprising:
providing selectable user interface menu options for inputting one or more characters into an edit window on a display screen of the mobile terminal,
wherein the user interface menu options are provided prior to the edit window being displayed on the display screen such that the edit window is automatically displayed when a user selects one of the menu options associated with selecting a type of character to be input in the edit window,
wherein the type of character comprises at least numeric type, text type of a first language, text type of a second language or special text characters,
wherein the input one or more characters are displayed in the edit window, and
wherein the edit window disappears in response to the input one or more characters being erased.

* * * * *